United States Patent [19]
Wiltz

[11] Patent Number: 4,781,869
[45] Date of Patent: Nov. 1, 1988

[54] MULTI-LEVEL FILM FILL ASSEMBLY COOLING TOWER

[76] Inventor: Vincent Wiltz, P.O. Box 88, Krotz Springs, La. 70750

[21] Appl. No.: 71,781

[22] Filed: Jul. 10, 1987

[51] Int. Cl.$^4$ .............................................. B01F 3/04
[52] U.S. Cl. .................................. 261/109; 261/111; 261/DIG. 11; 261/112
[58] Field of Search ............ 261/DIG. 11, 109, 112.2, 261/111

[56] References Cited

U.S. PATENT DOCUMENTS

| | | | |
|---|---|---|---|
| 707,042 | 8/1902 | Wheeler et al. | 261/DIG. 11 |
| 2,512,271 | 6/1950 | Green | 261/DIG. 11 |
| 3,400,917 | 9/1968 | Richards | 261/DIG. 11 |
| 3,707,277 | 12/1972 | Phelps | 261/109 |
| 3,764,121 | 10/1973 | Fordyce | 261/DIG. 11 |

FOREIGN PATENT DOCUMENTS

| | | | |
|---|---|---|---|
| 4693 | of 1902 | United Kingdom | 261/DIG. 11 |
| 10448 | of 1908 | United Kingdom | 261/DIG. 11 |

*Primary Examiner*—Tim Miles
*Attorney, Agent, or Firm*—Pravel, Gambrell, Hewitt, Kimball & Krieger

[57] ABSTRACT

A cooling tower assembly comprising at least first and second layers of fill within the tower chamber, each of the first and second layers of fill having a source of water introduced above the fill for moving through gravity down through the fill during the cooling process. There is further included an upper fan member circulating at the top portion of the tower for drawing air through inlet panels along the walls of the tower through the first and second layers of fill to cool the water as it is percolating through the fill contents. The first and second layers of fill would be separated by a horizontal baffle member so that air pulled through the lower layer of fill would be prevented from contacting the first layer, but would flow through a centrally located air flow chamber within the upper layer of fill to be drawn out of the chamber by the fan. In addition, water percolating down through the upper layer of fill would not contact the second layer of fill, but would be directed into a water holding chamber in the lower portion of the tower via a plurality of drain pipes to prevent the overloading of water into the lower portion of fill during the water cooling process.

9 Claims, 4 Drawing Sheets

MULTI-LEVEL FILM FILL ASSEMBLY COOLING TOWER

BACKGROUND OF THE INVENTION

1. Field of the Invention

The apparatus of the present invention relates to cooling towers. More particularly, the present invention relates to a liquid-gas counter flow film type filled cooling tower including at least a first and second layer of fill providing a multiple capability of cooling water being distributed over the fill through the counter flow of fan drawn air.

2. General Background

It is well known in the art that a conventional cooling tower comprises a counter flow type horizontal layer of fill wherein a quantity of the water to be cooled is pumped in to be distributed over the fill so that air which is drawn from below and through the fill and is drawn out of the top of the tower serves to cool the water film being distributed through the fill in order to cool the water to a reasonable temperature to be re-utilized. The conventional cross flow towers include a single vertical fill section with the water fed from an over head source and the air being drawn therethrough from air inlets at the side of the tower. A cross flow tower is inherently less efficient in the transfer of heat than is a counter flow tower based on a unit of fill. Another problem confronted with the cross flow cooling tower is that the water which is loaded onto the top of the fill reach a maximum water load, and therefore any air attempting to be drawn through the fill in order to cool the water is substantially blocked as it may flow therethrough. That being the case, the amount of water being cooled through such a conventional tower from air being drawn through the fill from the top situated fan is very limited and serves as a disadvantage in attempting to cool large quantities of water.

Several patents have issued which address the cross flow or counter flow cooling towers, the most pertinent being as follows:

U.S. Pat No. 3,917,764 issued to Phelps, entitled "Sloped Film Filled Assembly Cooling Tower", relates to a cooling tower with the film fill assembly being on an inclined principal plane rather than the horizontal plane in order to effectuate cooling.

U.S. Pat. No. 4,048,265 issued to Fordyce, entitled "De-icing Apparatus For Water Cooling Towers Including Slotted Distribution Basis And Selectively Actuatable Valve Mechanism", relates to an apparatus for de-icing evaporative water cooling towers and permitting selective delivery of hot water from the upper distribution basin to the outer margin of the tower for de-icing of the fill structure in order to maintain adequate air flow therethrough.

U.S. Pat. No. 4,129,625 also issed to Fordyce, entitled "Selectively Controllable Water Curtain Tower", provides a de-icing apparatus similar to the previous Fordyce patent utilized in evaporative water cooling towers.

U.S. Pat. No. 3,880,964 also issued to Fordyce, entitled "Hot Water Supply And Distribution Structure For Cooling Towers", relates to a cross flow cooling tower having fire proof liquid supply means which includes a riser opening to an overhead film adjacent a hot water distributor for supplying hot liquid to the water distributor.

In U.S. Pat. No. 4,386,946 issued to Wurz, entitled "Water Cooling Tower Including A Suction Fan", the water cooling tower includes a cooling means and a suction fan further including a water catching channel around the wall of the air outlet passage at the bottom of the channel to collect water separated at and flowing along the air outlet passage channel.

U.S. Pat. No. 3,764,121 issued to Fordyce, entitled "Hyperbolic Cross Flow Cooling Tower With Basins And Fill Integrated Into Shell", teaches a type of hyperbolic cooling tower having a fill assembly structure between concrete hot water distribution and cold water basins in the tower shell adjacent the air inlet of the shell.

The remainder of the patents are also pertinent in the art:

| U.S. PAT. NO. | INVENTOR | TITLE |
|---|---|---|
| 3,815,334 | Kotting, et al | "Gas-Liquid Contact Device" |
| 4,460,521 | Stackhouse | "Crossflow Cooling Tower Fill Section" |
| 4,215,080 | Ribier, et al | "Liquid Collecting Device And Use Thereof In Liquid-Gas Contacting Apparatus" |
| 4,622,183 | Sonnenschein, et al | "Device For Transferring Cooling Water Of A Wet/Dry Cooling Tower To Recirculation Means" |
| 3,865,911 | Lefevre | "Cooling Tower Type Waste Heat Extraction Method And Apparatus" |
| 4,312,646 | Fattinger, et al | "Gas Scrubbing Tower" |
| 4,003,970 | Vodicka | "Combined Wet And Dry Heat Transfer System And Method For Cooling Towers" |

SUMMARY OF THE PRESENT INVENTION

The assembly of the present invention solves the shortcomings in the art in providing a system for allowing substantial increase in the cooling capacity of a standard counter flow cooling tower. What is provided is a cooling tower assembly comprising at least first and second layers of fill within the tower chamber, each of the first and second layers of fill having a source of water introduced above the fill for moving through gravity down through the fill during the cooling process. There is further included tower for drawing air through inlet panels along the wall of the tower through the first upper and second lower layer of fill to cool the water as it is percolating through the fill contents. The first and second layers of fill would be separated by a horizontal baffle member so that air pulled through the lower layer of fill would not proceed upward through the first layer, but would flow through a centrally located air flow chamber to bypass the upper layer of fill to be drawn out of the chamber by the fan. In addition, water percolating down through the upper layer of fill would not percolate down through the second layer of fill, but would be distributed into a water holding chamber at the lower portion of the tower via a plurality of drain pipes bypassing the lower level of fill to prevent the overloading of water into the lower portion of fill during the water cooling process.

Therefore, it is a principal object of the present invention to provide a water cooling tower assembly including multilayers of fill for increasing the cooling capacity of the tower;

It is still a further principal object of the present invention to provide an improved water cooling tower assembly having an upper layer of fill and a lower layer of fill, the layers of fill separated so that water percolating down through the upper layer does not flow into the lower layer but flows into the water holding chamber at the floor of the tower;

It is still a principal object of the present invention to provide a water cooling tower assembly which includes multiple layers of fill, but maintains an equal air flow distribution between the upper layers and lower layers of fill, to prevent overloading of either the first or second layers of fill; and It is a still further object of the present invention to provide a water cooling tower assembly which enables the assembly to accommodate a substantial increase in the quantity of water distributed and cooled through the cooling tower during the cooling process.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENTS

Figure 1:
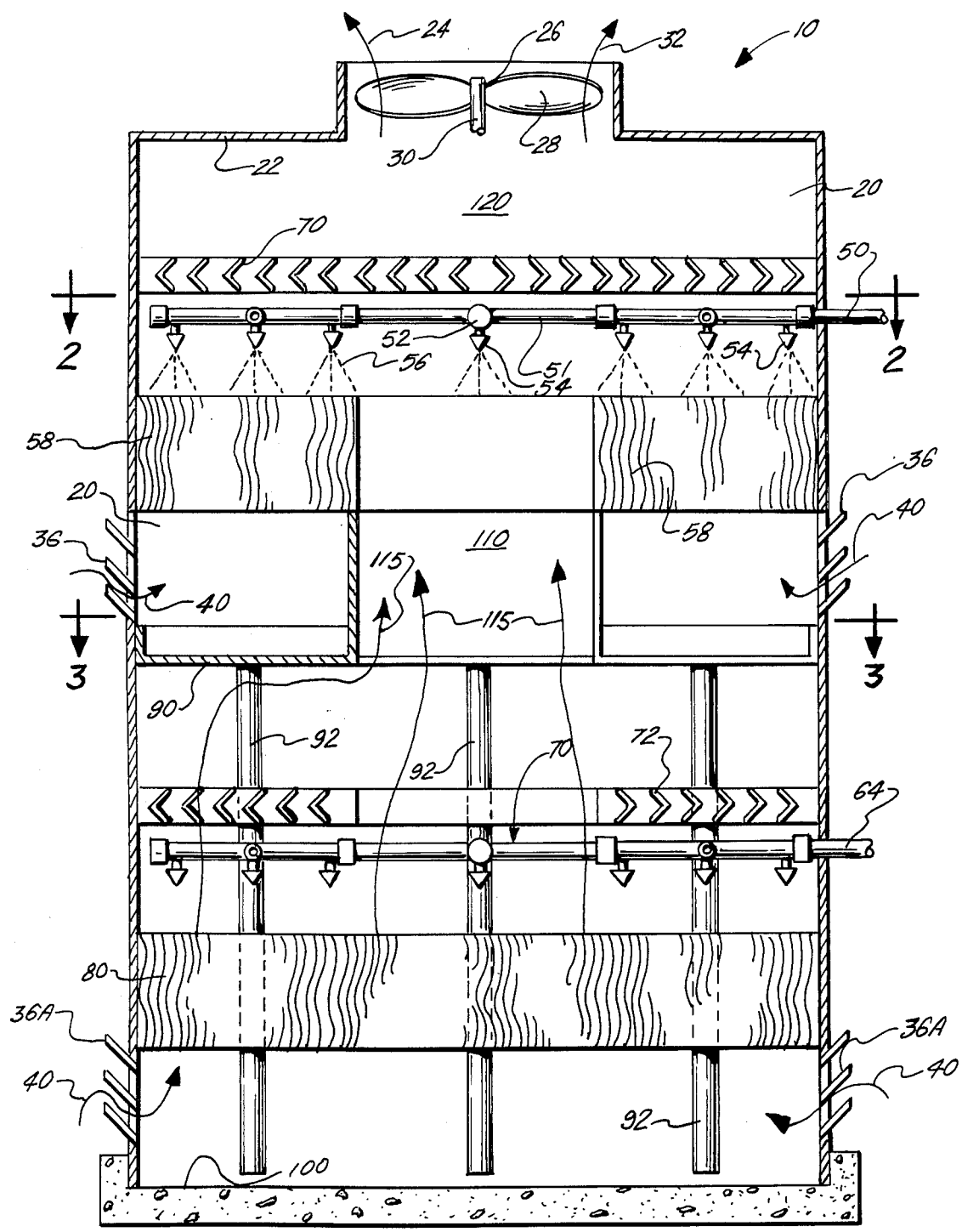
FIG. 1 represents a cross-sectional view of the overall embodiment of the apparatus of the present invention.

FIGS. 1-7 represent the preferred embodiment of the apparatus of the present invention of a cooling tower assembly 10. Cooling water assembly 10 is substantially comprised of a closed wall substantially rectangular shaped cooling tower frame 11, including upright walls 12, 14, 16, and 18, with the upright walls 12, 14, 16, and 18, defining a closed water cooling tower chamber 20 therewithin, of the type of cooling tower known as a conventional counter flow cooling tower, in which water containing substantial heat is percolated down through the tower and air is drawn through the tower to cool the water as it percolates through the tower.

The cooling tower frame 11 would further include a top portion 22, which would substantially define a means for sealing off the upper portion of the tower 10, with the top portion 22 including a centrally located air flow channel 24 housing a fan 26, with a fan 26 including a plurality of of.vanes 28 whereby rotation of the fan 26 via shaft 30, would draw air through chamber 18, in the direction of Arrows 32, as will be discussed further.

Walls 12, 14, 16, and 18, further includes a first upper plurality of air inlet panels 36 which are located along the length of each wall portion, at strategic points along the wall portion, so that air drawn in through the air inlet panels 36 in the direction of Arrows 40, flows through a portion of fill in order to serve the cooling purpose. In addition, as illustrated, the preferred embodiment of cooling tower 10 also includes a second lower series of air inlet panels 36A which serve a similar purpose to allow air flow to enter tower 10, but at a different area in the tower 10, crucial to the overall invention.

Figure 4:
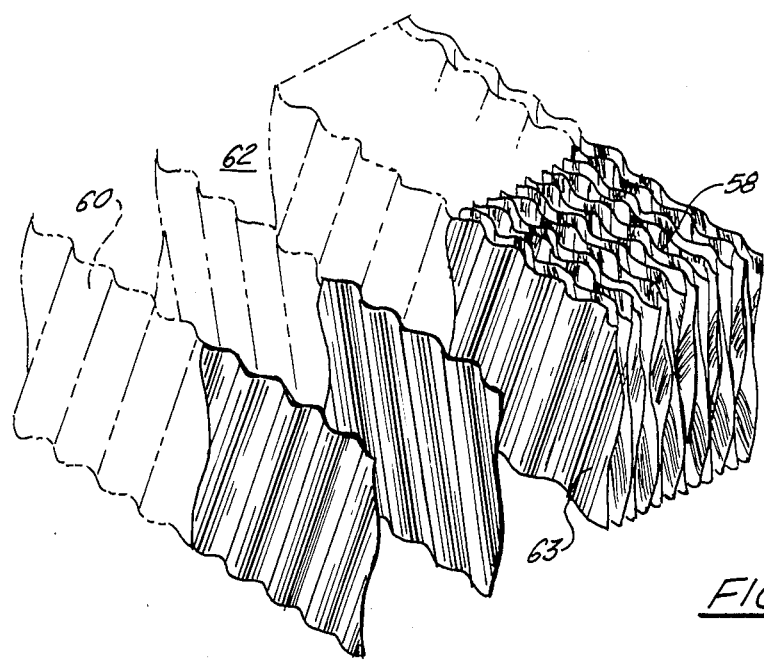
FIGS. 4, 5 and 6 represent overall exploded views of the conventional type fill that is utilized in the preferred embodiment of the apparatus of the present invention.
Figure 5:
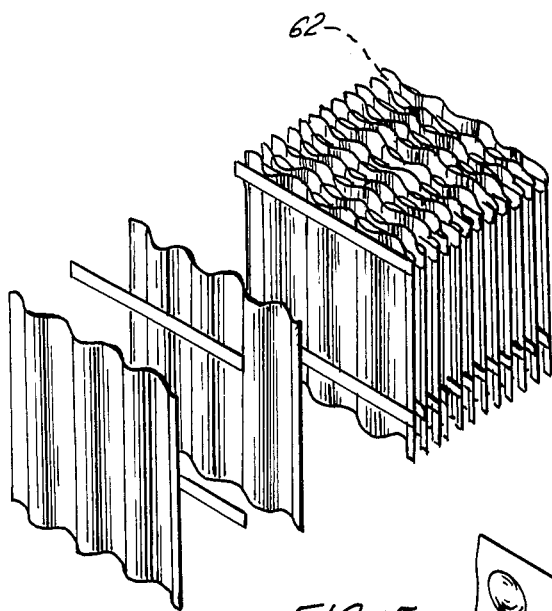
Figure 6:
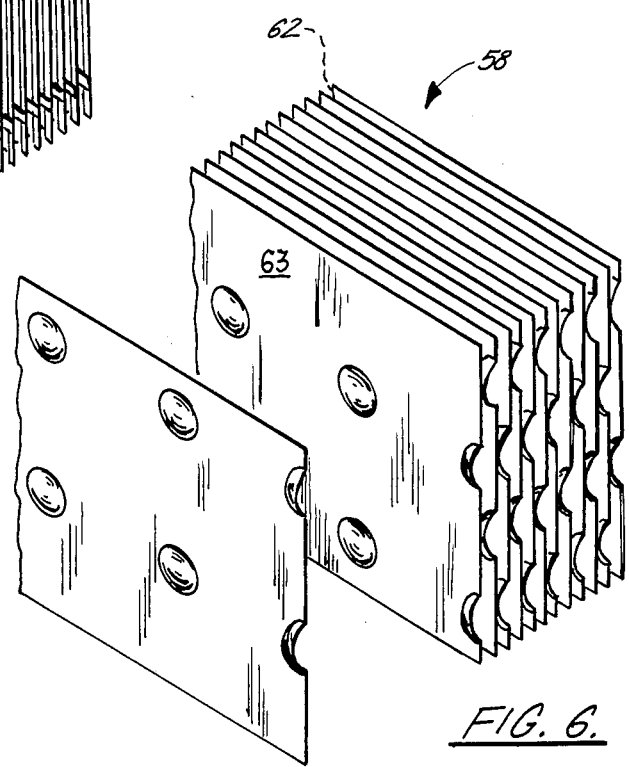

Turning now to the internal contents of tower 10, as seen specifically in the Figures, tower 10 would include an upper principal water inlet line 50 which would serve to introduce water containing an undesirable quantity of heat therein, to be removed by the tower during operation. As seen particularly in FIG. 2, water inlet line 50 would form a substantially rectangular pattern of internal water line 51 within the confines of tower 10, including a plurality of spigot pipes 52 emanating therefrom, so that water could be distributed throughout the confines of the internal chamber 20 of tower 10 via water nozzles 54 as seen in cross-sectional view of FIG. 1. Water (as seen in lines 56), which is being distributed from nozzles 54 would fall into a first upper layer of fill 58, which, in the preferred embodiment, as illustrated in FIGS. 4–6, may constitute a plurality of corrugated metal plates on elements 60, having a flow space 62 therethrough, so that water flowing through fill 58 would form a "film" along the surface 63 of end plate 60, to provide a greater surface area for the air to contact the water in order to cool it as it flows through upper layer of fill 58. This combination would constitute the first means for cooling the water flowing through tower 10 during operation.

Figure 2:
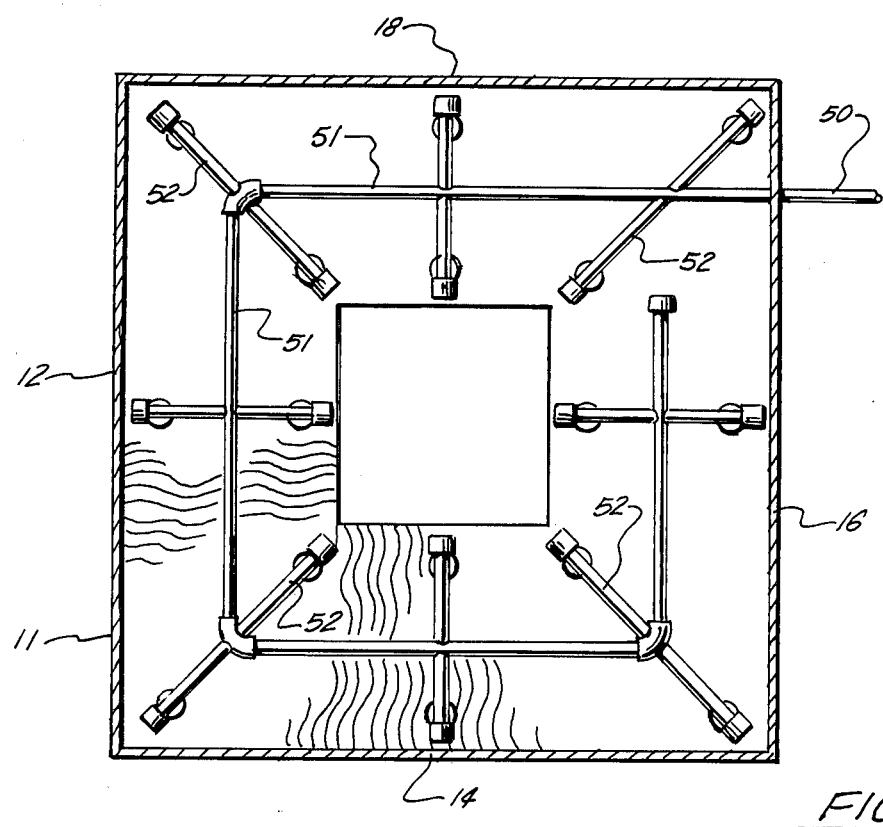
FIG. 2 represents a cross-sectional view along lines 2—2 in FIG. 1 of the preferred embodiment of the apparatus of the present invention.

In addition, there is illustrated in FIG. 1, a second lower water inlet pipe 64, which like upper pipe 50 allows the introduction of water into the lower portion of tower 10, utilizing an identical water distribution assembly as was previously illustrated in FIG. 2, with the lower distribution of water assembly 70 likewise flowing through a second lower section of fill 80, again, the fill in the preferred embodiment constituting the type of fill that would be contained in the upper layer of fill as illustrated in FIGS. 4–6, and allowing again a second distribution of water into the tower for cooling therethrough. Therefore, it is seen that in this multiple layer cooling tower of the present invention, a capacity of water flowing therethrough that is cooled may be doubled in the process in this novel arrangement, and may in fact include additional layers of fill to provide a multiple layer of fill cooling tower assembly. In addition, as seen in FIG. 1, cooling tower assembly would include a first upper assembly of droplet eliminator 70 and a lower assembly of droplet eliminator 72 which would prevent movement of water into the plenum chamber 120 as air is forced upward through the fill layers 58 and 80 respectively. This is a conventional structure in these types of cooling towers.

Figure 3:
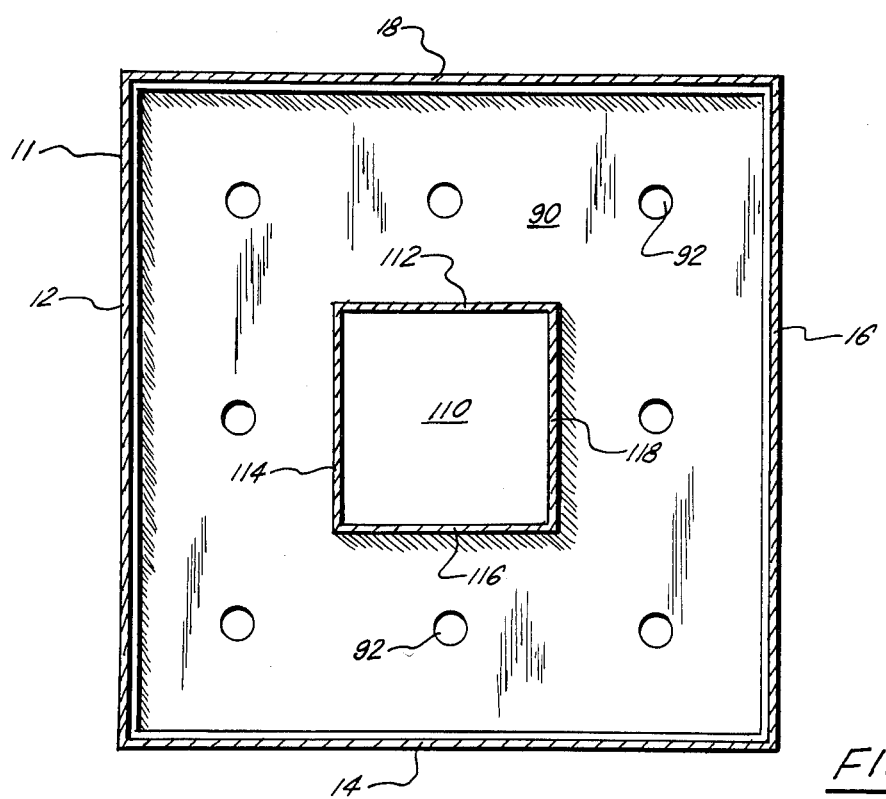
FIG. 3 represents a cross-sectional view along lines 3—3 in FIG. 1 of the preferred embodiment of the apparatus of the present invention.

Reference is now made to the Figures to illustrate the means by which the water flowing through the upper layer of fill 58 is prevented from flowing into the lower layer of fill 80, to prevent overload in the distribution of water therefrom. This means includes a lower horizontally located baffle plate 90 which is substantially positioned a distance below the upper portion of fill 58, so that any water exiting the upper layer of fill 58 flows onto the upper surface of baffle plate 90 and is prevented from flowing past the plate 90 into the lower level of fill 80. This prevents the overloading of water percolating downward through the lower level of fill 80 and overloading that level. Further, baffle plate 90, as is illustrated in FIG. 3, is provided with a plurality of downward depending flow pipes 92, which serve to allow any water flowing onto baffle 90 to flow down flow pipes 92 into the lower floor portion 100 of cooling tower 10, with each of the flow pipes 92 flowing through and bypassing the lower portion of fill 80, and not allowing any water from the upper portion of fill 58, which is percolated onto baffle plate 90, to make contact or to interfere with the water flowing through lower fill 80. As with any cooling tower, any water which has been cooled and is flowing onto the floor portion 100 of tower 10 is evacuated from tower 10 via a pumping means (not illustrated) so that the water may be redistributed through the system after the water has undergone cooling.

The system further includes a means for preventing air, which is drawn upward through the lower level of fill 80 after having picked up a quantity of heat from the water cooled therein, from making contact with the upper layer of fill 58 so that the upper layer of fill 58 serves as a cooling means for the water being percolated therethrough as efficiently as possible. This means includes an internal air flow channel 110, as illustrated in FIG. 3, defined by four side walls 112, 114, 116, and 118. The side walls serve to prevent air flowing into tower 10 through panels 36A, upward through lower fill layer 80, from contacting the upper fill layer 58, since the four side walls are integrally attached to the lower baffle plate 90. Walls 112, 114, 116, and 118 serve as a means to direct air flow 115, after flowing through the lower fill 80 and encountering the baffle member 90, and through the internal air flow channel 110, past the upper layer of fill 58, and up into air plenum chamber 120 to be drawn out of tower 10 via fan 26.

It should be noted as seen in FIG. 1, that the fill contained in lower fill layer 80 spans the entire internal tower space 20 with the exception of the intrusion of downward depending flow pipes 92 which are directed through lower fill layer 80 to deposit water flowing from upper fill layer 58. This is unlike upper fill layer 58 which includes the internally located air flow chamber 110 for directing air upward through the tower without the air contacting the upper layer 58 of fill after making contact with lower layer 80 of fill.

It is therefore foreseen that this type of cooling tower would allow the introduction of a greater quantity of water into the tower 10 to be cooled by at least two, although not limited to two layers of fill 58 and 80 in the tower, in such a manner that the water flowing downward through the upper layer of fill 58 does not contact and flow into the lower layer of fill 80, thus preventing any possibility of overload of the lower layer of fill due to the water that may percolate downward through the upper nozzle water distribution assembly 51. In addition, this novel assembly would allow any air flowing upward through the system which may have picked up heat from the water in the lower level of fill 80 not to flow through the upper layer of fill 58 and perhaps result in less cooling of the water in the upper layer 58 due to the fact that the air has been overheated from its passage to the lower level of fill 80. This novel combination allowing the distribution of water through the system in such a manner effectuates a greater cooling capacity, and is therefore quite novel in the art.

For purposes of construction, the construction of cooling tower 10 would be constructed of conventional materials and in particular, the type of fill that may be used in the tower 10 does not necessarily restrict it to the type of fill as illustrated in the Figures, but may be of any type of fill that would allow water to percolate downward therethrough to be cooled by air drawn up through the fill during the process. Although the water film type of fill is stipulated in the drawings, the patent should not be limited to this type of fill and should allow the use of additional types of fill that may be utilized in the present state of the art or in the future.

Figure 7:
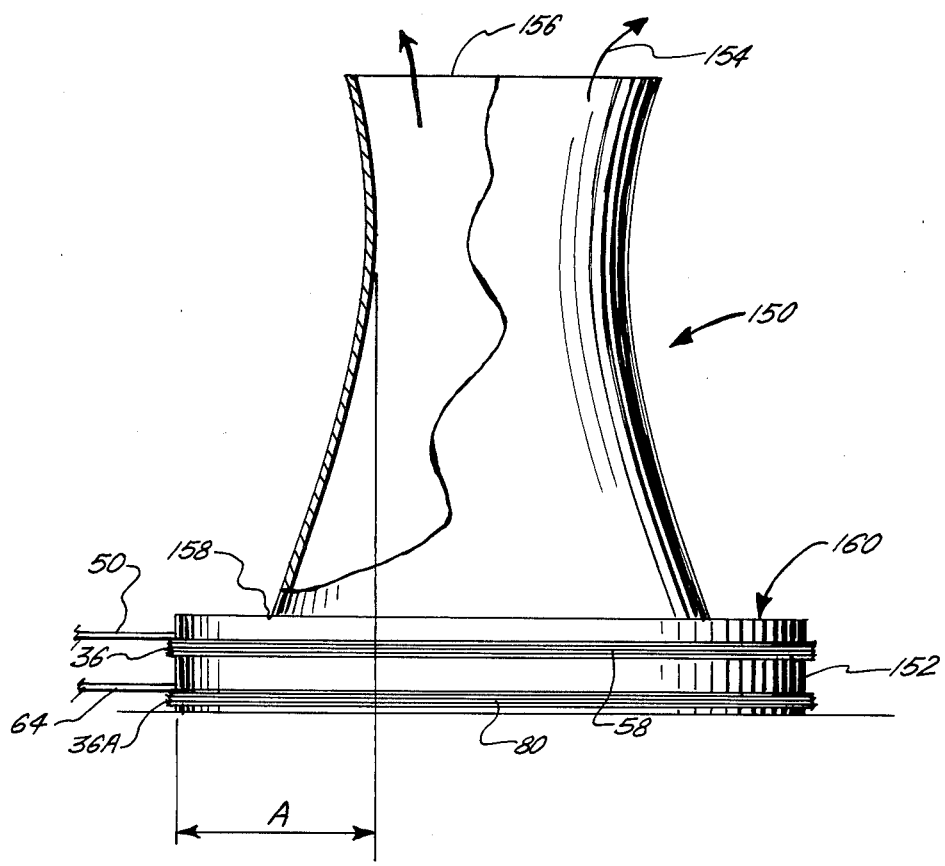
FIG. 7 represents a cross-sectional cutaway representational view of a hyperbolic cooling tower which may utilize the preferred embodiment of the apparatus of the present invention.

FIG. 7 illustrates the type of cooling tower 150 which is known in the art as a hyperbolic cooling tower and in effect would allow air drawn from the lower portion 152 of the tower structure into the base of the tower 150 to flow upward in the direction of Arrows 154 out of the open top end portion 156 of tower 150. Unlike the cooling tower construction in the preferred embodiment, a hyperbolic cooling tower of this sort does not contain a fan means, yet works upon the principle of the hyperbolic shape of the tower increasing the flow of air from the lower portion 158 to the upper portion 156 of the tower through the natural upward flow of hot air drafting therethrough.

Therefore, for purposes of construction, it should be noted that the lower rectangular portion 160 of tower 150, as seen in FIG. 7, would represent in effect the type of rectangular configuration that is found in the tower 10 in the preferred embodiment, but yet not including the fan 26. Therefore, as represented in FIG. 7, there would be included the upper inlet water line 50, the lower inlet water line 64, the upper series of inlet panels 36, the lower inlet panels 36A, and the upper fill portion 58, and the lower fill portion 80. Therefore, the means by which the ar is drawn through the tower 150, as was explained earlier, is through the hyperbolic action of the air, yet the construction and functioning of the lower portion 160 as seen in FIG. 7 would be in effect identical to the functioning of the tower as seen in the preferred embodiment. Although it is not clearly illustrated in FIG. 7, that portion of the Figure designated as "A" could represent a cross section of that portion 160 of the tower as is illustrated in FIG. 1. This cross section would of course include the upper internal air channel 110 for allowing air flow to bypass the upper fill layer 58, and would include the downward depending water drain pipes 92 that would bypass the lower fill layer 80 in order to drain off the water percolating through upper fill layer 58.

What follows are tables which show the efficiency of a conventional counter flow cooling tower and the tower of the present invention. The efficiency of a conventional counter flow cooling tower is shown in Table I. The efficiency of the multi-layer cooling tower of the present invention is shown in Table II. Table III is a comparison between the conventional and the multi-level towers.

In the tables:

BHP is brake horsepower;

L/G is liquid-to-gas ratio, in pounds water per pound dry air;

KaV/L is tower characteristic, where:

K is overall enthalpy transfer coefficient in pounds per hour per square foot per pound water per pound dry air;

a is area of transfer surface per unit of tower volume, in square feet per cubic feet;

V is the effective cooling tower volume, in cubic feet per square foot plan area;

L is mass water flow, in pounds per hour per square foot plan area;

Q/A is tower capability per area, in percent of design water flow per square feet;

ACFM is actual cubic feet per minute;

FPM is feet per minute;

CHP is corrected horsepower; and

HP is horsepower.

Turning to Table I it should be noted that in a conventional tower which would have a water flow rate of 6100 gallons per minute, an inlet temperature of 111.5° F. and exit temperature of 87° F., with a cell length of 42' and a cell width of 30', with a fill height of 7', in order to achieve a 97.2% capacity, the total horse power required would be 136.1158.

As compared against the present invention in Table II, utilizing the same water flow rate, inlet temperature and exit temperature, with a cell length of 78' rather than 42' due to the doubling of the cell capacity, and a fill height of 5', the total horse power required to achieve 126.6% capacity is 61.62521. Thus, from a comparison of the conventional vis-a-vis the present invention, it is clear that the present invention is a more efficient unit.

Table III is a computer run comparing the efficiency of a regular counter flow cooling tower to that of the multi-level fill assembly cooling tower of the present invention. For purposes of comparison, on the lower portion of the diagram, compared a single regular run against three runs by the multilevel fill assembly unit, the important statistic is the fact that the static pressure of the regular is 0.914 as opposed to the static pressure on the three units in the multiple run in the multifill assembly as 0.416, 0.340, and 0.297 respectively. In essence, less static pressure would mean a greater flow of air is flowing through the unit due to the combination of fills in combination with the water and air distribution assemblies.

TABLE I

| CONVENTIONAL COUNTERFLOW COOLING TOWER | |
|---|---|
| ANALYSIS | 1 |
| INLET TEMPERATURE | 111.5° F. |
| EXIT TEMPERATURE | 87° F. |
| WET BULB TEMPERATURE | 82° F. |
| WATER FLOW RATE | 6100 gal/min |
| ELEVATION | 48 feet |
| DISSOLVED SOLIDS | 0 |
| FILL TYPE FILM | FILL |
| 14' VELOCITY RECOVERY STACK | 1 |
| PRINTOUT CODE | 0 |
| NO. OF CELLS | 1 |
| CELL LENGTH | 42 feet |
| CELL WIDTH | 30 feet |

TABLE I-continued

| FILL HEIGHT | 7 feet | |
|---|---|---|
| FAN DIAMETER | 20 feet | |
| EXISTING BHP | 125 | |
| COOLING TOWER EVALUATION | | |
| L/G | 1.215626 | |
| KaV/L | 2.627197 | |
| Q/A | 4.84127 | |
| ACFM PER FAN | 631048.4 | |
| EXIT AIR TEMP, F. | 99.84123 | |
| STATIC PRESS, IN H$_2$O | .9143869 | |
| VELOCITY, FPM | 500.8321 | |
| CHP | 1.083759 | |
| REQUIRED BHP | 136.1158 | |
| TOTAL HP REQUIRED | 136.1158 | THE % CAPACITY IS 97.20295 |

TABLE II

| ANALYSIS | 1 | |
|---|---|---|
| INLET TEMPERATURE | 111.5° F. | |
| EXIT TEMPERATURE | 87° F. | |
| WET BULB TEMPERATURE | 82° F. | |
| WATER FLOW RATE | 6100 gal/min | |
| ELEVATION | 48 feet | |
| DISSOLVED SOLIDS | 0 | |
| FILL TYPE FILM | FILL | |
| 14' VELOCITY RECOVERY STACK | 1 | |
| PRINTOUT CODE | 0 | |
| NO. OF CELLS | 1 | |
| CELL LENGTH | 78 feet | |
| CELL WIDTH | 30 feet | |
| FILL HEIGHT | 5 feet | |
| FAN DIAMETER | 20 feet | |
| EXISTING BHP | 125 | |
| COOLING TOWER EVALUATION | | |
| L/G | 1.015468 | |
| KaV/L | 2.239127 | |
| Q/A | 2.606838 | |
| ACFM PER FAN | 747368.9 | |
| EXIT AIR TEMP, F. | 97.00307 | |
| STATIC PRESS, IN H$_2$O | .2976365 | |
| VELOCITY, FPM | 319.3884 | |
| CHP | 1.076074 | |
| REQUIRED BHP | 61.62521 | |
| TOTAL HP REQUIRED | 61.62521 | THE % CAPACITY IS 126.5556 |

TABLE III

COMPUTER RUNS SHOWING REGULAR COUNTERFLOW COOLING TOWER COMPARED TO A MULTI-LEVEL FILL ASSEMBLY COOLING TOWER

| TOWER | SQ/FT WATER LOADING | WATER FLOW (gal/min) | AIR FLOW (cu.ft./min) | HORSE POWER | STATIC PRESSURE (h$_2$o) | FILL HEIGHT (feet) |
|---|---|---|---|---|---|---|
| REGULAR | 4.84 | 6,100 | 722,155 | 125 | .914 | 5 |
| MULTI | 2.6 | 6,100 | 956,905 | 114 | .41598 | 3.3 |
| MULTI | 2.6 | 6,100 | 830,161 | 79.3 | .340 | 4.17 |
| MULTI | 2.6 | 6,100 | 747,368 | 61.6 | .297 | 5 |
| 125%/waterflow | 3.25 | 7,625 | 934,211 | 125 | 4721 | 5 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A multi-level counterflow cooling tower assembly, comprising:

(a) at least one upright side wall portion having a first, upper air inlet opening;

(b) a first, upper water inlet for introducing water at a point above the first air inlet opening;

(c) a first upper layer of fill positioned intermediate the first air inlet opening and the first water inlet for receiving water flow therethrough as water is introduced into the first water inlet;

(d) a second, lower air inlet opening located below the first air inlet opening;

(e) a second, lower water inlet above the second air inlet opening;

(f) a second, lower layer of fill intermediate the second air inlet opening and the second water inlet means for receiving water flow flowing from the second water inlet, the lower layer of fill being vertically aligned with the upper layer of fill;

(g) means for preventing water which has flowed through the upper layer of fill from contacting the lower layer of fill; and (h) channel means, for allowing air which has flowed through the lower layer of fill to flow from below the upper layer of fill to above the upper layer of fill without contacting the upper layer of fill.

2. The assembly of claim 1, further including a fan member situated above the upper water inlet so that rotation of the fan member draws air through the first and second air inlet openings.

3. The assembly in claim 1, further including a plurality of air inlet means along each side wall of the tower.

4. The assembly in claim 1, wherein the means for preventing water which has flowed through the upper layer of fill from contacting the lower layer of fill comprises a plurality of water flow pipes which pass through the lower layer of fill.

5. The assembly in claim 1, further comprising a plurality of droplet eliminators.

6. The assembly in claim 1, further comprising a water receiving means at the bottom of the tower for receiving water after the water flows therethrough.

7. A multi-level counterflow cooling tower assembly, comprising:

(a) a plurality of upright side wall portions joined together to define a cooling space therewithin, at least one of said upright side wall portions having first air inlet openings therethrough;

(b) a first, upper water inlet for introducing water at a point above the first air inlet openings;

(c) first, upper fill means positioned intermediate the first air inlet openings and the upper water inlet for receiving water flow therethrough as water is introduced into the upper water inlet;

(d) second air inlet openings located below the first, upper fill means;

(e) second, lower water inlet means above the second air inlet openings;

(f) a second, lower fill means intermediate the second air inlet openings and the second water inlet for receiving water flow flowing from the second water inlet, the lower fill means being vertically aligned with the upper fill means;

(g) baffle means below the upper fill means for preventing any water flowing downward through the upper fill means from contacting the lower fill means; and (h) channel means, passing through the upper fill means, for preventing air flowing upward from the lower inlet air means from contacting the first fill means.

8. The apparatus in claim 7, further including fan means at the top portion of the tower for drawing air upward through the first and second air inlet openings.

9. A multi-level counterflow cooling tower assembly, comprising:

(a) at least one upright side wall portion having a first air inlet opening;

(b) a first water inlet for introducing water at a point above the first air inlet opening;

(c) an upper layer of fill positioned intermediate the first inlet opening and the first inlet for receiving water flow therethrough as water is introduced into the first water inlet;

(d) a second air inlet opening located below the first air inlet opening;

(e) a second water inlet above the second air inlet opening;

(f) a lower layer of fill intermediate the second air inlet opening and the second water inlet means for receiving water flow flowing from the second water inlet, the lower layer of fill being vertically aligned with the upper layer of fill;

(g) means for preventing water flowing through the upper layer of fill from contacting the lower layer of fill comprising a plurality of water flow pipes for receiving water from the upper layer of fill, the pipes passing through the lower layer of fill; and (h) means for preventing air flowing through the lower layer of fill from contacting the upper layer of fill comprising a centrally located wall chamber which passes through the upper layer of fill.

* * * * *